(12) United States Patent
Lee (10) Patent No.: US 11,313,374 B2
(45) Date of Patent: Apr. 26, 2022

(54) INDUSTRIAL CEILING FAN STRUCTURE

(71) Applicant: Mao-Tu Lee, New Taipei (TW)

(72) Inventor: Mao-Tu Lee, New Taipei (TW)

( * ) Notice: Subject to any disclaimer, the term of this patent is extended or adjusted under 35 U.S.C. 154(b) by 269 days.

(21) Appl. No.: 16/706,689

(22) Filed: Dec. 7, 2019

(65) Prior Publication Data

US 2020/0263700 A1 Aug. 20, 2020

(30) Foreign Application Priority Data

Feb. 19, 2019 (CN) .......................... 201910124165.2
Feb. 19, 2019 (CN) .......................... 201920211853.8
Jun. 18, 2019 (CN) .......................... 201910525963.6
Jun. 18, 2019 (CN) .......................... 201920915134.4

(51) Int. Cl.
| | |
|---|---|
| *F04D 25/08* | (2006.01) |
| *F04D 29/34* | (2006.01) |
| *F21V 33/00* | (2006.01) |
| *F21Y 115/10* | (2016.01) |

(52) U.S. Cl.
CPC ......... *F04D 25/088* (2013.01); *F04D 25/082* (2013.01); *F04D 29/34* (2013.01); *F21V 33/0096* (2013.01); *F21Y 2115/10* (2016.08)

(58) Field of Classification Search
None
See application file for complete search history.

(56) References Cited

U.S. PATENT DOCUMENTS

| | | | |
|---|---|---|---|
| 9,523,371 B2 | 12/2016 | Hollan et al. | |
| 10,931,156 B2 * | 2/2021 | Chen | H02K 7/14 |
| 2010/0109465 A1 * | 5/2010 | Yang | H02K 21/22 |
| | | | 310/68 B |
| 2013/0026877 A1 * | 1/2013 | Matsuda | H02K 1/17 |
| | | | 310/216.106 |
| 2020/0251964 A1 * | 8/2020 | Sasaguri | H02K 1/28 |

* cited by examiner

*Primary Examiner* — Juan G Flores
(74) *Attorney, Agent, or Firm* — Pai Patent & Trademark Law Firm; Chao-Chang David Pai (57) ABSTRACT

An industrial ceiling fan structure utilizes a coupling structure between the fan blades and the motor main unit and the design of a pressing member attached to the mounting segment of the root of each fan blade to enhance the fan blade mounting strength. Furthermore, the ceiling fan motor provides an outer race and an inner race to secure the permanent magnets without an adhesive, thereby preventing the permanent magnets from loosening and improving the service life of the ceiling fan motor. In addition, through the heat dissipation structure of the outer casing of the motor main unit and the structure of the lamp, the heat dissipation of both the lamp and the motor main unit of the ceiling fan can be achieved.

6 Claims, 15 Drawing Sheets

INDUSTRIAL CEILING FAN STRUCTURE

BACKGROUND OF THE INVENTION

(a) Field of the Invention

The present invention relates to ceiling fan technology and more particularly to a large industrial ceiling fan structure for use in a large space such as shopping mall or factory.

(b) Description of the Prior Art

Today's large industrial ceiling fans have a diameter of 3 to 8 meters, and each fan blade has a weight of 8 kilograms. The centrifugal inertia of the fan blades at high speed cannot be underestimated. Therefore, for the installation of the fan blades of large industrial ceiling fans, the structural strength and anti-fall safety measures are particularly important. Regarding the mounting of the fan blades of a conventional large industrial ceiling fan, for example, the plugging method is disclosed in U.S. Pat. No. 9,523,371. However, this method does not provide any proper fall protection. Therefore, how to take care of the rigidity of the fan blade assembly and the safety design of the anti-dropping is one of the topics that the invention strives to overcome.

Secondly, large industrial ceiling fans usually use an external rotor motor to combine the outer rotor on the inner wall of the motor casing, and the inner stator is coupled to the fixed shaft in the center of the motor. The effect of the magnetic field of the electromagnet of the inner stator drives the outer rotor and the motor casing to rotate, causing rotation of the fan blades that are affixed to the top or bottom side of the motor casing. The known outer rotor is provided with a plurality of permanent magnets corresponding to the inner stator. Since the permanent magnets cannot be locked easily, they are usually adhered to the inner wall of the magnetic sealing ring in the motor casing. At most, spacers are placed between the permanent magnets. However, the technique of adhering the permanent magnets is prone to cause the permanent magnets to loosen, thus affecting the service life of the motor. For this reason, how to overcome the disadvantage that the permanent magnets cannot be locked, and the permanent magnet adhesive structure can easily loosen is also a subject that the invention actively addresses.

In addition, the diameter of the fan blades of a large industrial ceiling fan is as large as 3 to 8 meters, so the space lighting above the ceiling fan will be hindered, and the lamp cannot be installed above the ceiling fan, which will cause the rotating blades to project shadows under the ceiling fan, causing a clear and dark interval, which is visually discomforting. So, the lamp must be installed under the ceiling fan to avoid shadow projection when the fan blades are rotated. Further, the PMSM motor (permanent magnet synchronous motor) used in large industrial ceiling fans uses powerful permanent magnets (such as neodymium iron boron magnets) to generate a magnetic field with the stator. However, the excessive temperature is a fatal injury to the permanent magnets, which causes the magnetic properties to weaken and the power of the ceiling fan to decrease. Therefore, how to take care of the heat dissipation of the lamp and the motor of the ceiling fan is the subject that the invention actively overcome.

SUMMARY OF THE INVENTION

The present invention has been accomplished under the circumstances in view. It is one object of the present invention to provide an industrial ceiling fan structure, which provides a coupling structure between the fan blades and the motor main unit and a design of a pressing member attached to the mounting segment of the root of each fan blade to enhance the fan blade mounting strength, preventing falling of any fan blade that is accidentally broken.

It is another object of the present invention to provide an industrial ceiling fan structure, which uses an outer race and an inner race for the ceiling fan motor to secure the permanent magnets without an adhesive, thereby preventing the permanent magnets from loosening and improving the service life of the ceiling fan motor.

It is still another object of the present invention to provide an industrial ceiling fan structure, which provides the outer casing of the motor main unit with a heat dissipation structure and a lamp structure design to achieve the heat dissipation of the lamp and the motor main unit of the ceiling fan.

Other advantages and features of the present invention will be fully understood by referring to the following specification in conjunction with the accompanying drawings, in which like reference signs denote like components of structure.

DETAILED DESCRIPTION OF THE PREFERRED EMBODIMENTS

Referring to the annexed drawings, an industrial ceiling fan structure in accordance with the present invention generally comprises a hanger 1, motor main unit 2, a plurality of blades 3, and a plurality of pressing members 4 (4a, 4b, 4c). The motor main unit 2 is mounted by the hanger 1 in a selected position such as a beam of a ceiling. The blades 3, and the pressing members 4a, 4b, 4c are locked to the motor main unit 2. Thus, the installation of the industrial ceiling fan structure is completed.

Figure 1:
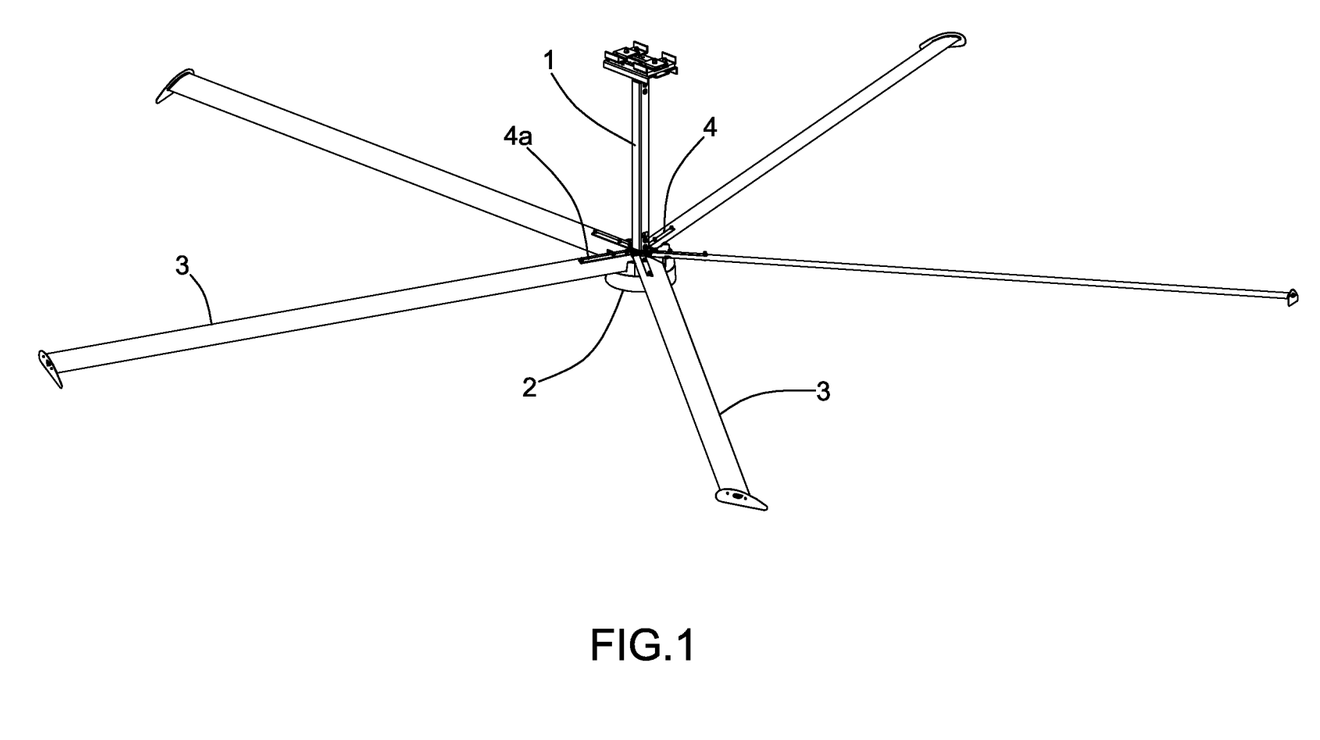
FIG. 1 is an oblique top elevational view of an industrial ceiling fan structure in accordance with a first embodiment of the present invention.
Figure 2:
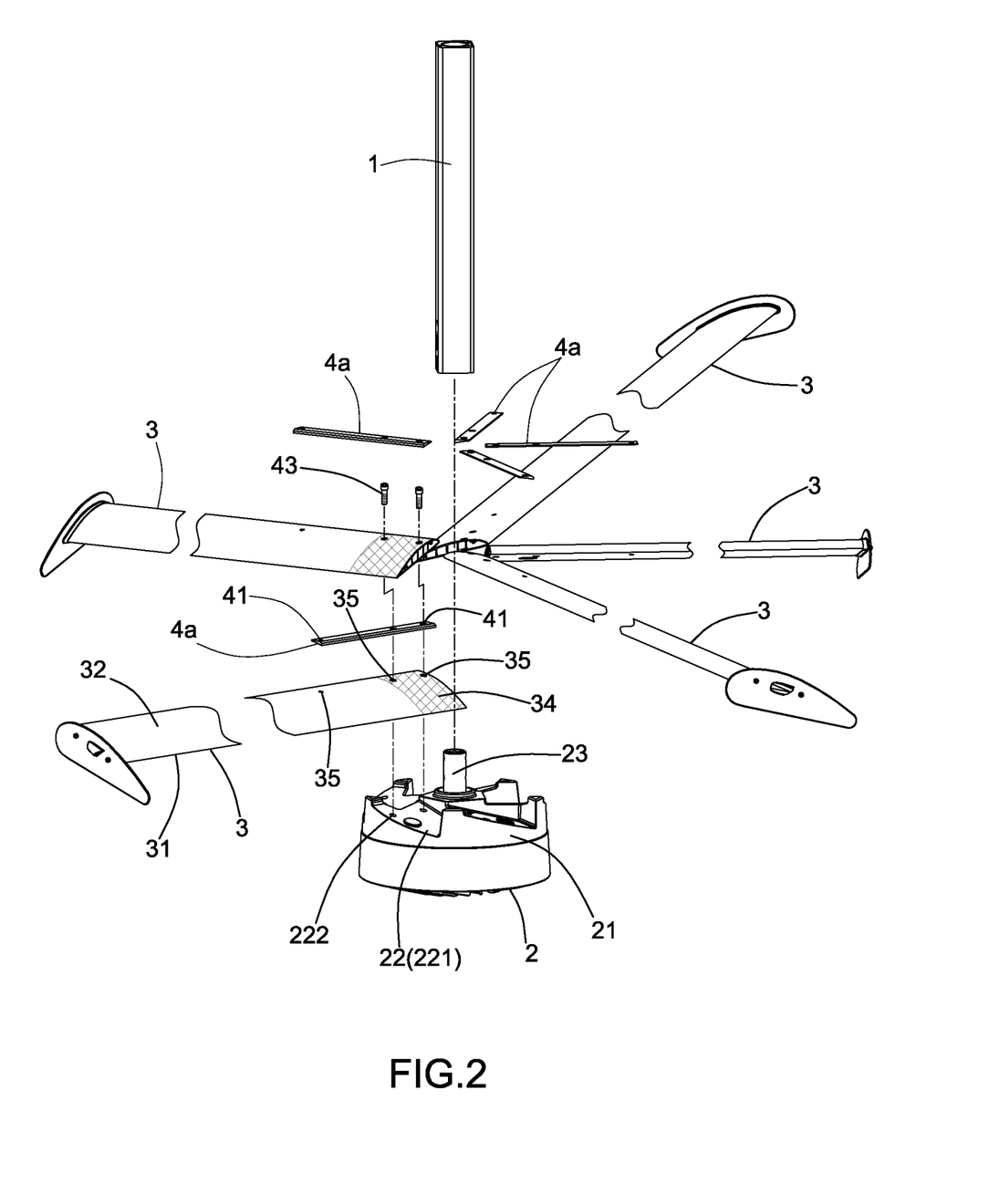
FIG. 2 is an exploded view of the industrial ceiling fan structure in accordance with the first embodiment of the present invention.

Referring to FIGS. 1 and 2, the motor main unit 2 is an external rotor motor. The rotatable outer casing 21 of the motor main unit 2 is made of an aluminum alloy. The outer casing 21 has a plurality of mounting grooves 22 located on a top side thereof for the mounting of the blades 3. The surface 221 of each mounting groove 22 is a sloping surface provided with a plurality of locking holes 222.

Figure 3:
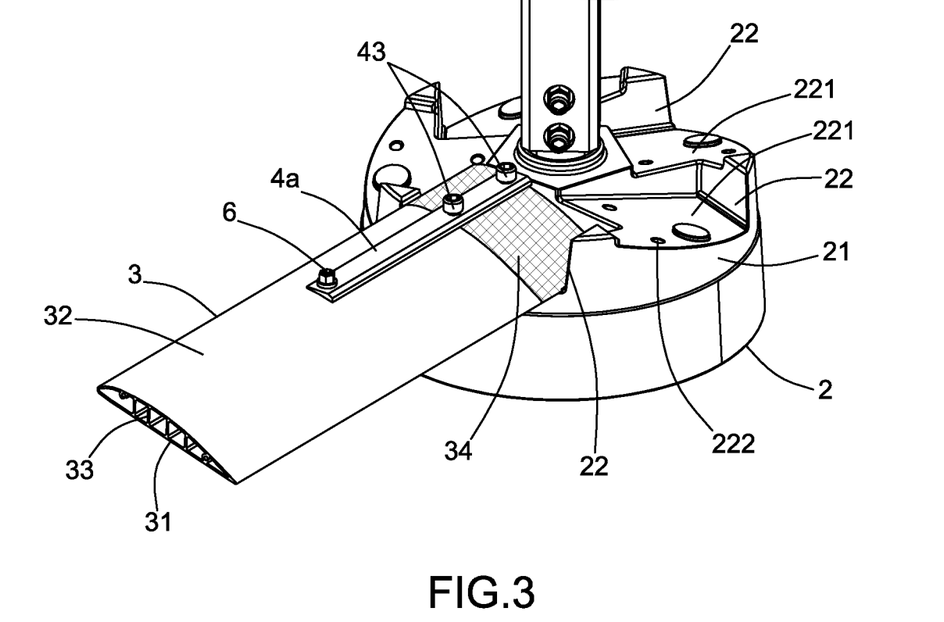
FIG. 3 is a sectional view of a part of the industrial ceiling fan structure in accordance with the first embodiment of the present invention.

The motor main unit 2 has a fixed shaft 23 protruding from the center of the top side thereof and the fixed shaft 23 is used for the motor main unit 2 to be connected to the hanger 1. The interior of the motor main unit 2 is composed of a motor structure. The blades 3 are strip-shaped blades extruded from an aluminum alloy or another metal or alloy. The bottom of each blade 3 is a flat surface 31. The top of each blade 3 is a streamlined convex arc surface 32. The overall section of each blade 3 is shaped like a water droplet tube. Each blade 3 has a plurality of ribs 33 connected between the flat surface 31 and the convex arc surface 32. Each blade 3 has a mounting segment 34 located at one end thereof (as shown in the meshed area in FIG. 2 and FIG. 3). The mounting segment 34 is adapted to one respective mounting groove 22. The mounting segment 34 of each blade 3 is provided with a plurality of perforations 35 for threading screws.

According to the first embodiment of the present invention, the pressing members 4a are elongated strip members extruded from an aluminum alloy, having a length greater than the mounting segment 34 of each blade 3.

Each pressing member 4a has a plurality of through holes 41. The positions of the through holes 41 correspond to the perforations 35 of the blades 3.

When the industrial ceiling fan of the present invention is installed, the fixed shaft 23 of the motor main unit 2 is plugged and locked with the hanger 1, then the mounting segments 34 of the blades 3 are respectively inserted into the respective mounting grooves 22 of the motor main unit 2, and then screw bolts 43 are respectively inserted through the through holes 41 of the pressing members 4a and the perforations 35 of the blades 3 and threaded into the respective locking holes 222 of the motor main unit 2 to lock the blades 3 to the motor main unit 2.

Figure 4:
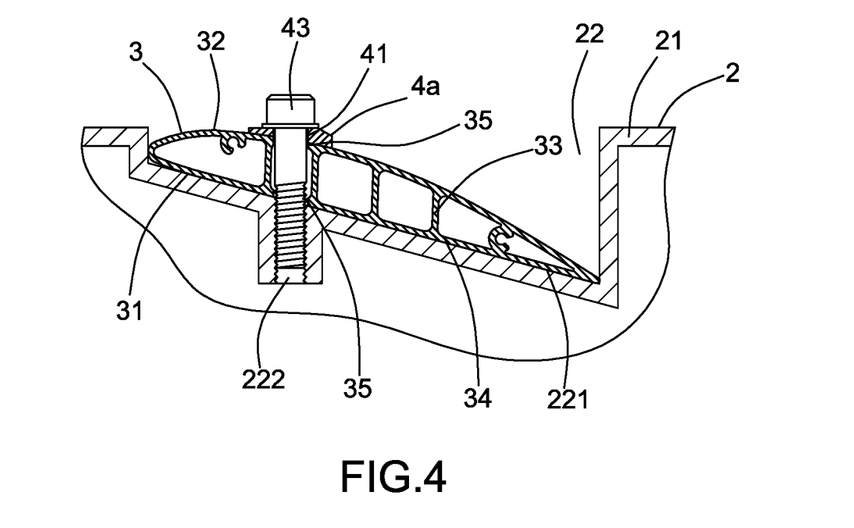
FIG. 4 is a schematic sectional view of a part of the industrial ceiling fan structure in accordance with the first embodiment of the present invention, showing the design of the pressing member.

Referring to FIG. 4, the blades 3 are locked in the respective mounting grooves 22 of the motor main unit 2 by the pressing members 4a, so that the mounting strength of the mounting segments 34 of the blade 3 is sufficient to resist the external lateral wind pressure at the moment of the load, thereby improving the ability of the fan to receive the wind laterally.

Figure 5:
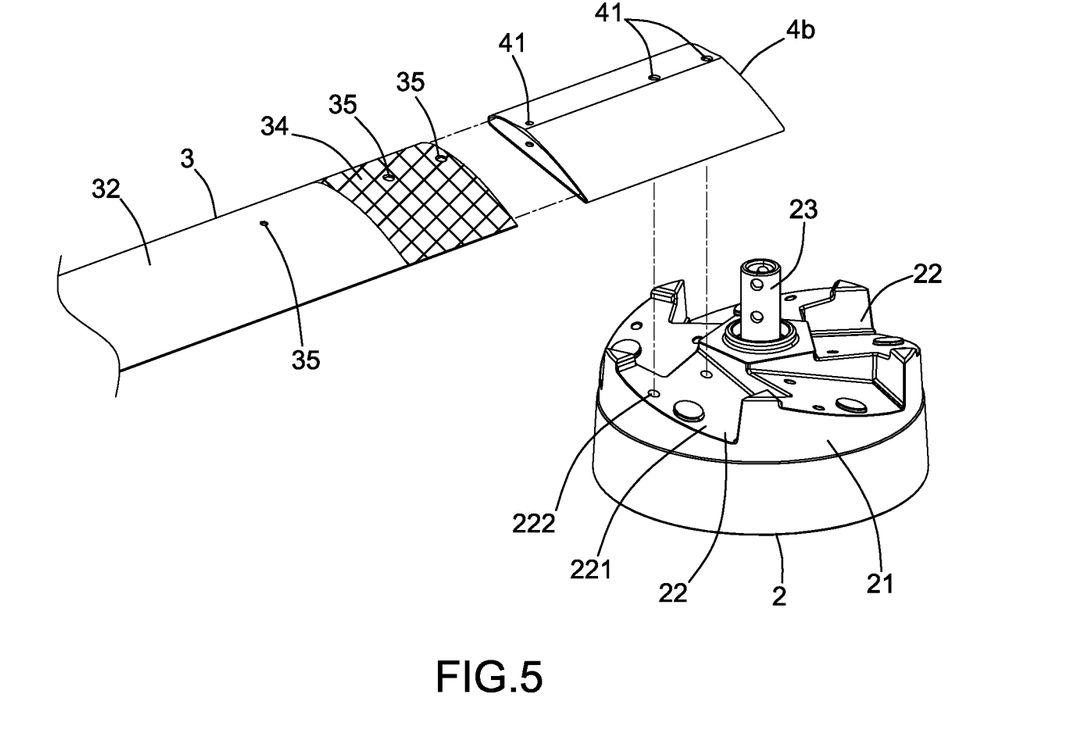
FIG. 5 is an exploded view of a part of an industrial ceiling fan structure in accordance with a second embodiment of the present invention.
Figure 6:
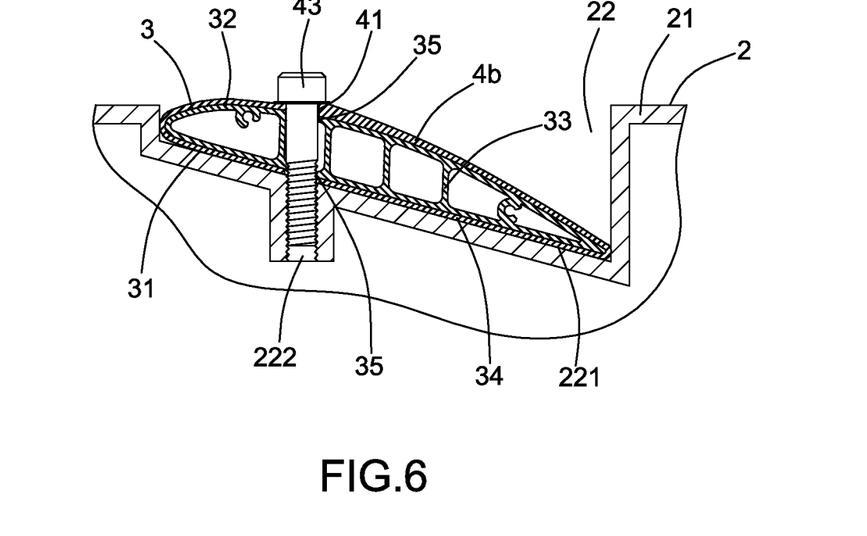
FIG. 6 is a schematic sectional view of a part of the industrial ceiling fan structure in accordance with the second embodiment of the present invention, showing the design of the pressing member.

According to the second embodiment of the present invention as shown in FIGS. 5 and 6, the pressing members 4b are respectively implemented as a tube, and the cross-sectional shape of the inner contour of the tubes is adapted to the outer cross-sectional shape of the blades 3, the length of the tubes is larger than the mounting segments 34 of the blades 3, and the tube of each of the pressing members 4b is also provided with a plurality of through holes 41 where the positions of the through holes 41 correspond to the perforations 35 of the blades 3. Thereby, one end of each pressing member 4b is sleeved onto the mounting segment 34 of one respective blade 3, and the other end of each blade 3 extends outward. Thereby, the through holes 41 of the pressing members 4b correspond to the perforations 35 of the blades 3. Thus, the pressing members 4b cover the roots of the blades 3 that are fastened to the motor main unit 2. The covering range covers all areas of the mounting segments 34, and also covers a portion of the mounting segments 34 that extend outward. Then, screw bolts 43 are respectively inserted through the through holes 41 and the perforations 35 and then threaded into the respective locking holes 222 of the motor main unit 2. Thereby, this second embodiment can strengthen the root of each blade 3 so as to resist external force when facing the downward forward wind pressure or the lateral wind pressure when the industrial ceiling fan is activated to induce wind.

Figure 7:
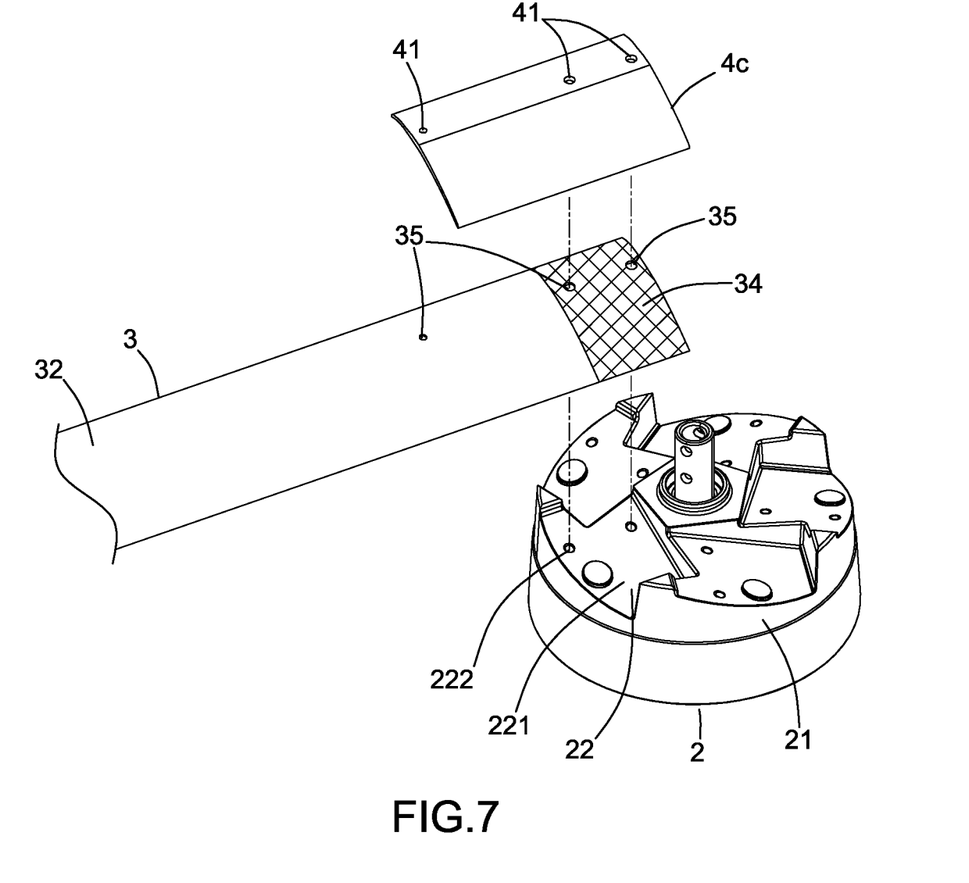
FIG. 7 is an exploded view of a part of an industrial ceiling fan structure in accordance with a third embodiment of the present invention.
Figure 8:
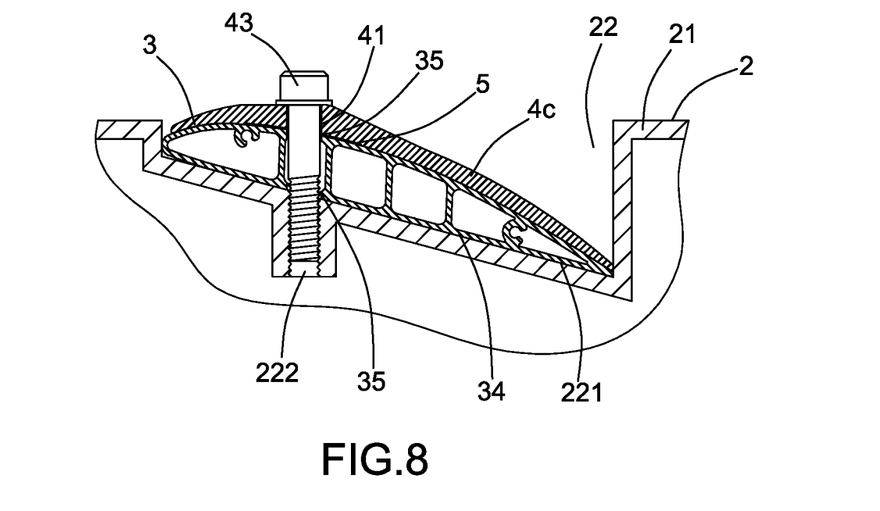
FIG. 8 is a schematic sectional view of a part of the industrial ceiling fan structure in accordance with the third embodiment of the present invention, showing the design of the pressing member.

According to the third embodiment of the present invention as shown in FIGS. 7 and 8, the pressing members 4c are respectively implemented as a plate member. The cross-sectional shape and curvature of the plate member correspond to the convex arc surfaces 32 of the blades 3. The plate members of the pressing members 4c are respectively provided with a plurality of through holes 41. The positions of the through holes 41 correspond to the perforations 35 of the blades 3. When the application is implemented, the plate members of the pressing members 4c are placed on the mounting segments 34 of the blade 3 and the mounting segments 34 of the blade 3 are inserted into the respective mounting grooves 22, and then screw bolts 43 are sequentially inserted through the respective through holes 41 and the respective perforations 35 and then threaded into the respective locking holes 222 of the motor main unit 2 to positively lock the blades 3 and the pressing members 4c to the outer casing 21 of the motor main unit 2.

Figure 9:
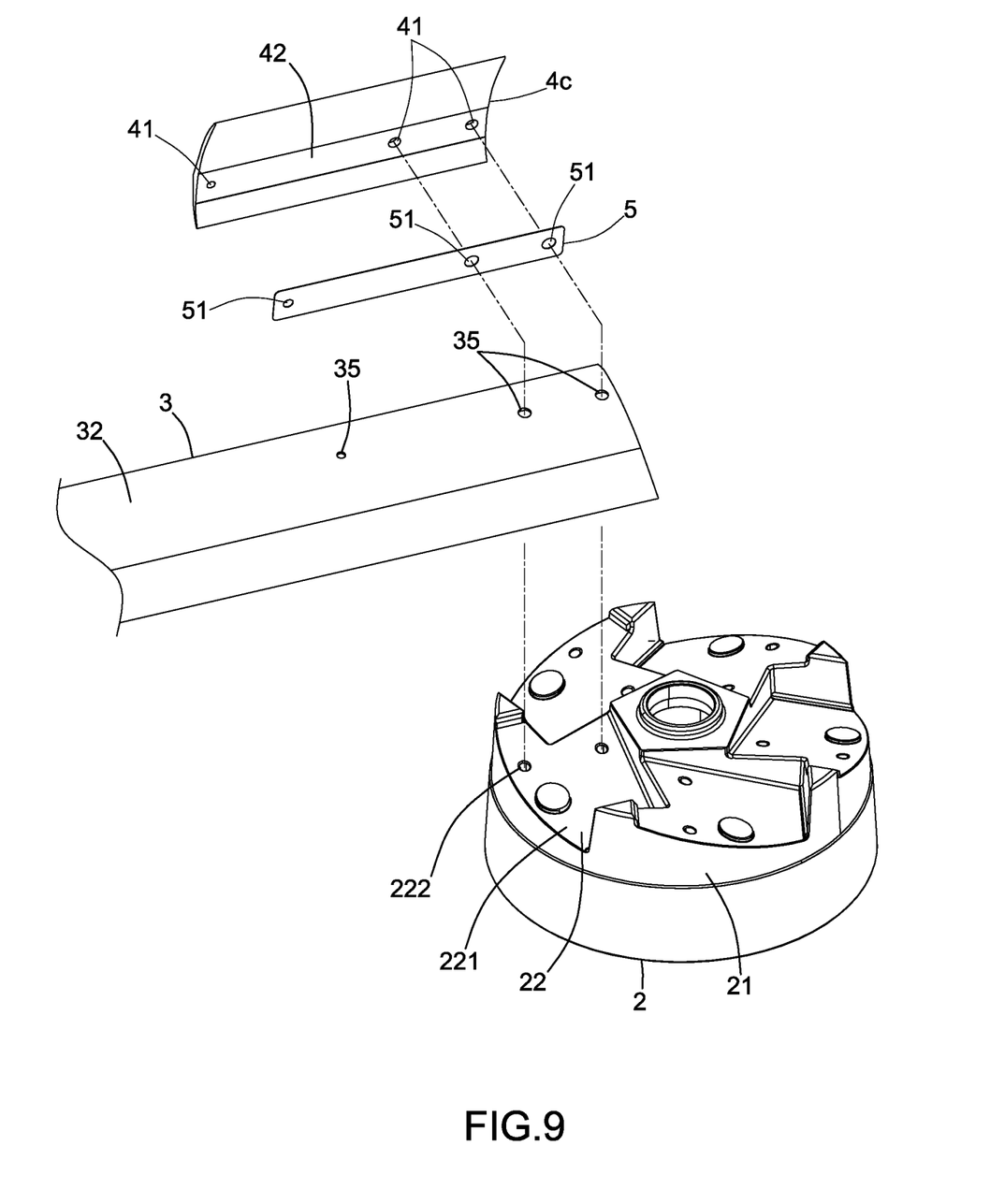
FIG. 9 is an exploded view of the pressing member and the packing member of the industrial ceiling fan structure in accordance with the third embodiment of the present invention.

Furthermore, as shown in FIG. 9, a packing member 5 may be interposed between the pressing member 4c and the blade 3 in the third preferred embodiment of the present invention. The packing members 5 are preferably formed by punching a stainless steel sheet into an elongated strip, and the elongated strip of stainless steel of each packing members 5 is provided with a plurality of through holes 51 corresponding in position to the through holes 41 of the pressing members 4c. The plate member of each of the pressing members 4c is provided with a shallow groove 42 at a bottom surface thereof corresponding to the convex arc surface 32 of each of the blades 3. The size of the shallow groove 42 matches the cross-sectional dimension of the packing member 5. Thereby, after the mounting segments 34 of the blade 3 are fitted into the respective mounting grooves 22 of the motor main unit 2, screw bolts 43 are respectively inserted through the through holes 41 of the pressing members 4c, the through holes 51 of the packing members 5 and the perforations 35 of the blades 3 and then threaded into the locking holes 222 of the motor main unit 2 to lock the blades 3, the pressing members 4c and the packing members 5 to the outer casing 21 of the motor main unit 2. The packing members 5 are used to improve the safety during the use of the fan. When the blade 3 is subjected to an improper external force, the maximum stress break point falls on the boundary between the mounting segment 34 of the blade 3 and the subsequent boundary. The packing member 5 is disposed at the top side of the boundary. Therefore, when the blade 3 is in a broken state, the trailing edge of the blade 3 with respect to the mounting segment 34 will be tied by the packing member 5 without falling, thus ensuring that the industrial ceiling fan has a more secure protection effect.

Figure 10:
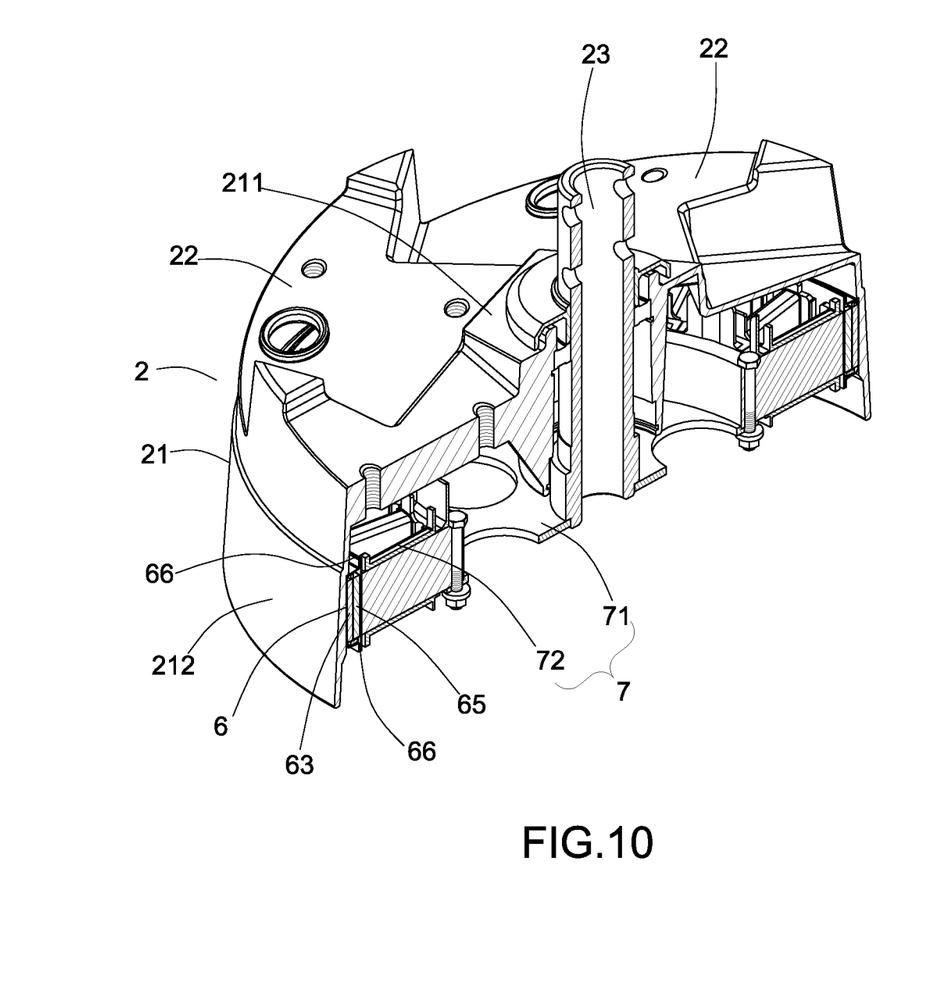
FIG. 10 is a sectional view of the motor main unit.
Figure 11:
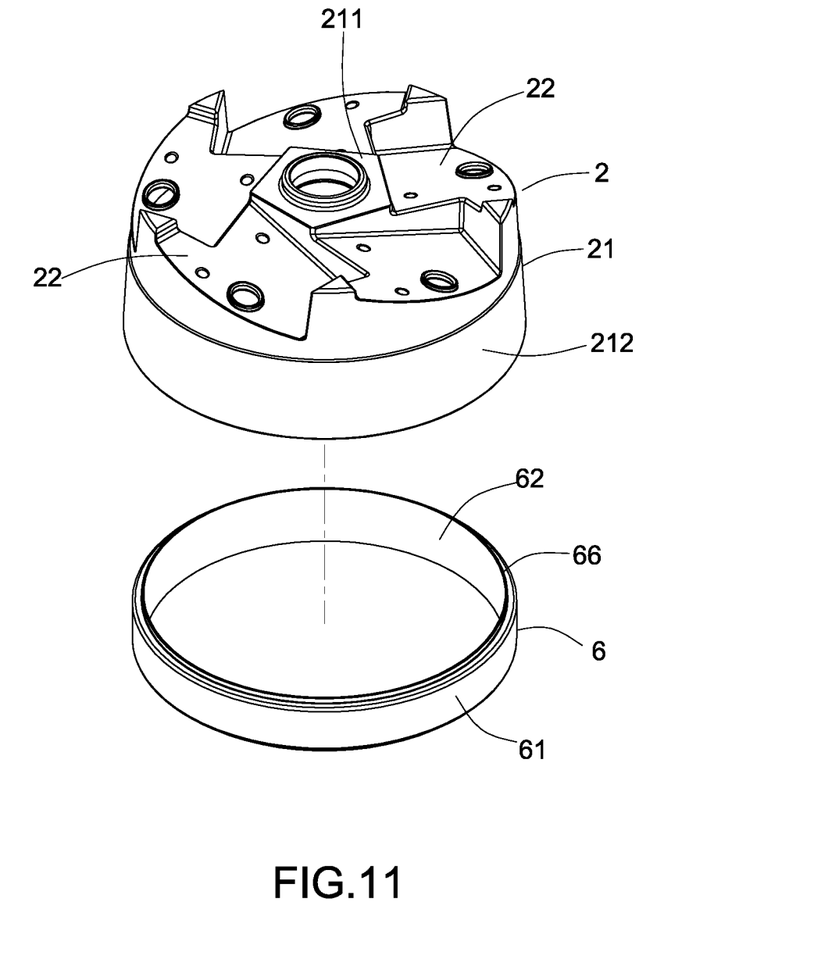
FIG. 11 is an exploded view of the outer casing and the outer rotor.

Referring to FIG. 10 and FIG. 11, one of the preferred embodiments of the outer casing 21 of the motor main unit 2 is an integrally cast aluminum alloy shell. Alternatively, the outer casing 21 can be implemented as a shell that is otherwise formed in a combined manner. The outer casing 21 mainly comprises a shell top 211, a peripheral wall 212 surrounding the shell top 211 and a plurality of the aforesaid mounting grooves 22 formed on the shell top 211, and the center of the shell top 211 is provided with the fixed shaft 23 described above. The outer casing 21 can be driven by a rotor 6 to rotate on the fixed shaft 23, causing synchronous rotation of the plurality of blades 3.

Referring to FIG. 10, the internal motor structure of motor main unit 2 comprises an outer rotor 6 and an inner stator 7. Referring also to FIGS. 11-14, the preferred embodiment of the outer rotor 6 comprises a circular outer race 61, a circular inner race 62, a magnetic seal ring 63, a magnet spacer ring 64 and a plurality of permanent magnets 65. The outer race 61 is fixed to the inner surface of the peripheral wall 212 of the outer casing 21. The inner race 62 is fixed to the inner surface of the outer race 61. The magnetic seal ring 63 is circumferentially coupled between the outer race 61 and the inner race 62. The magnet spacer ring 64 is circumferentially coupled to the inner side of the magnetic seal ring 63. The magnet spacer ring 64 is provided with a plurality of annularly arranged receiving holes 641. The permanent magnets 65 are respectively mounted in the receiving holes 641 of the magnet spacer ring 64. Thereby, each of the permanent magnets 65 is wrapped between the outer race 61 and the inner race 62 and held in place by the magnet spacer ring 64. The inner stator 7 mainly comprises a stator component 71 fixed to the fixed shaft 23 and located in the outer casing 21, and a plurality of electromagnets 72 (coil magnets) coupled around the stator component 71. Thereby, an electromagnetic field can be generated by the electromagnet 72 to drive the outer rotor 6 and the outer casing 21 to rotate.

Figure 12:
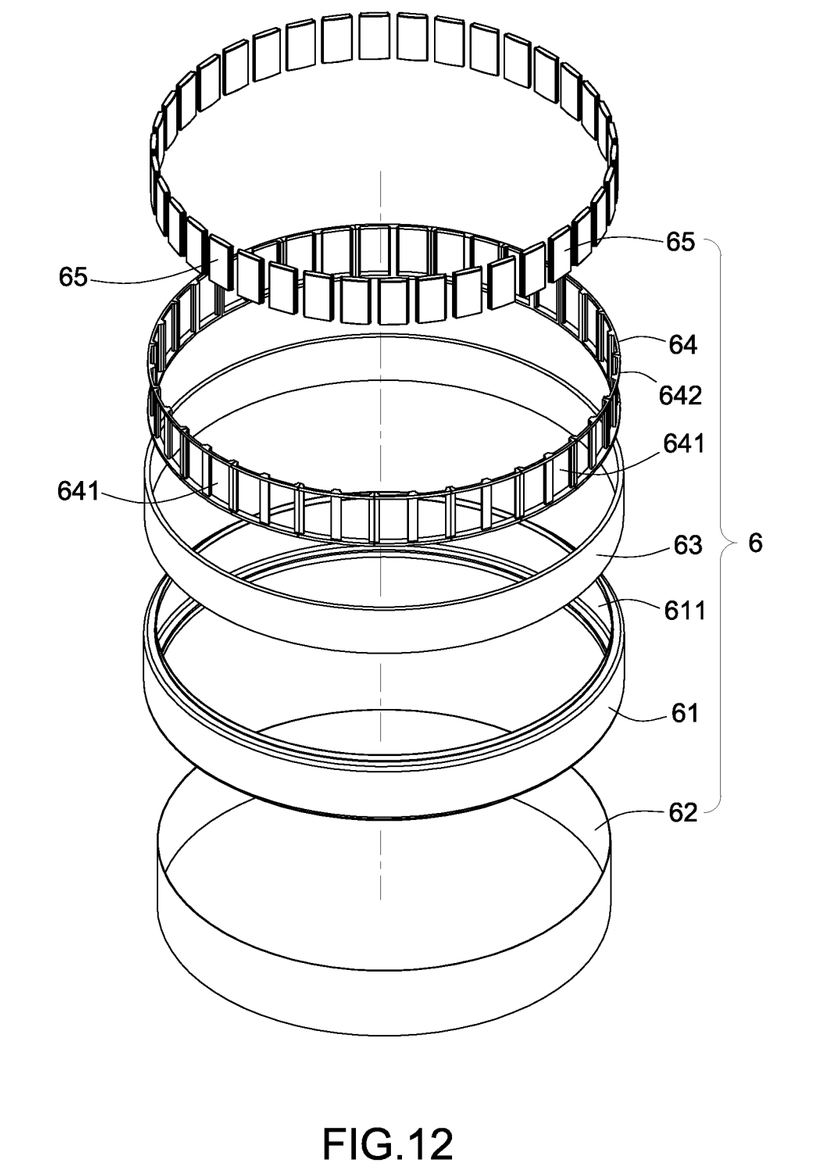
FIG. 12 is an exploded view of the outer rotor.
Figure 13:
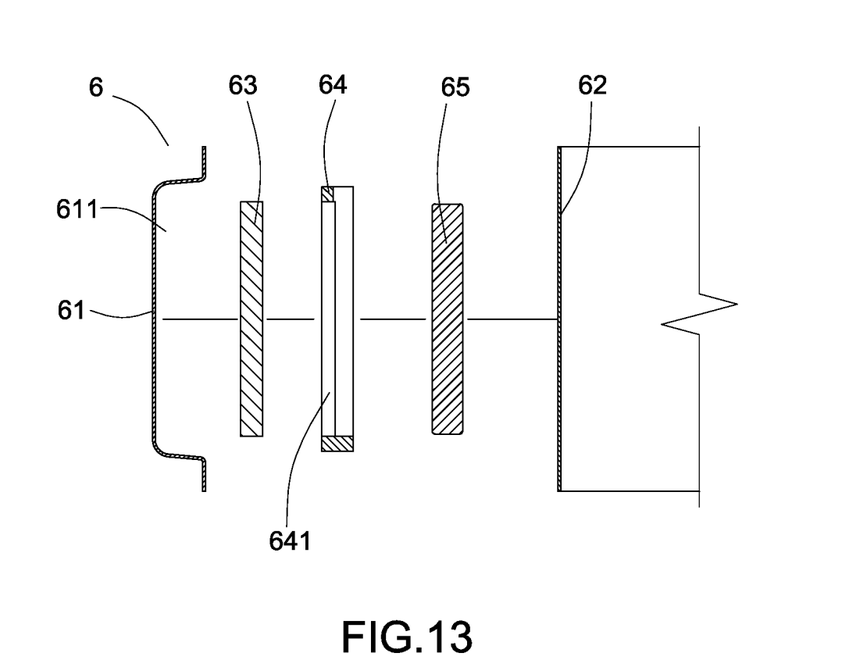
FIG. 13 is a sectional exploded view of the outer rotor.
Figure 14:
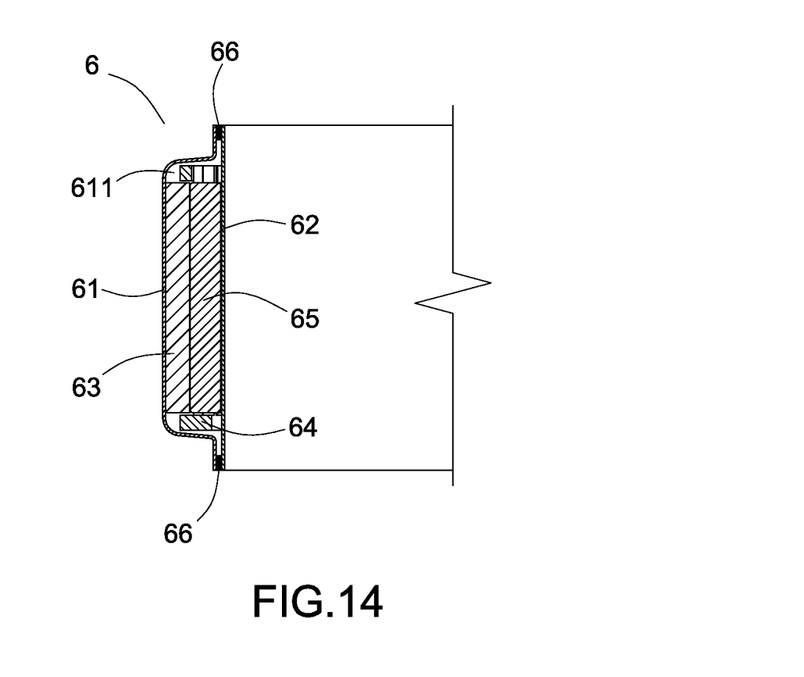
FIG. 14 is a sectional assembly view of the outer rotor.
Figure 15:
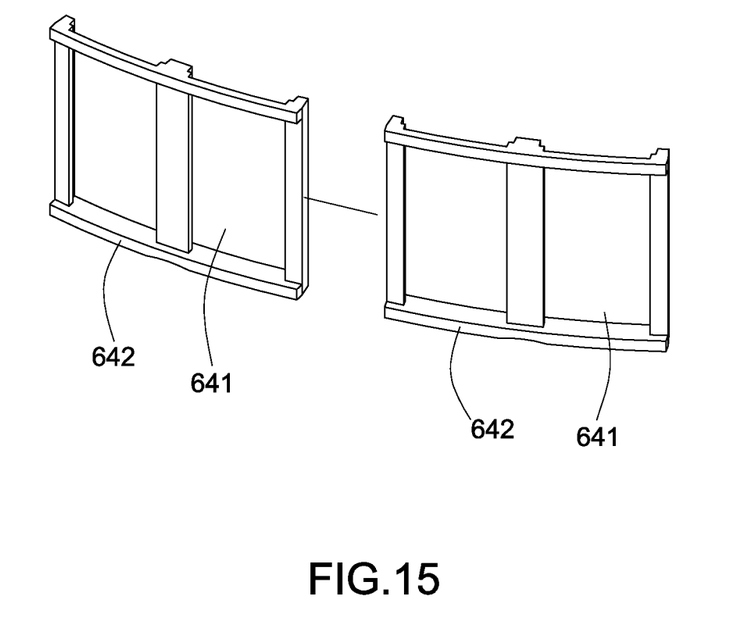
FIG. 15 is an exploded view of the magnet spacer ring.

Referring to FIGS. 12-14, the outer race 61 and inner race 62 of the outer rotor 6 are respectively composed of a stainless steel ring. The inner side of the outer race 61 is formed with a groove 611 by rolling or stamping. Thereby, the magnetic seal ring 63, the magnet spacer ring 64 and the permanent magnets 65 are accommodated in the groove 611 of the outer race 61. Then, the inner race 62 is mounted in the inner side of the outer race 61, and the upper and lower ends of the outer race 61 and the inner race 62 are respectively welded by a welding portion 66. By permanently fixing the magnetic seal ring 63, the magnet spacer ring 64 and the permanent magnets 65 between the outer race 61 and the inner race 62, the permanent magnets 65 may be prevented from falling off. In addition, when the outer race 61 and inner race 62 of the outer rotor 6 are assembled by a rolling sealing technique, the welding portion 66 can serve as a combined portion in the rolling and pressing process so that the outer race 61 and the inner race 62 can be firmly combined without falling off. In addition, as shown in FIG. 15, one of the preferred embodiments of the magnet spacer ring 64 is a circular ring body in which a plurality of curved spacers 642 are connected, and each of the curved spacers 642 is provided with one respective receiving hole 641. This makes it easier to set the magnet spacer ring 64 in the groove 611 of the outer race 61. It should be noted that the above magnet spacer ring 64 is not an essential component in the present invention, and when omitting the magnet spacer ring 64, the outer race 61 and the inner race 62 can still be used to prevent the permanent magnets 65 from falling off.

Figure 16:
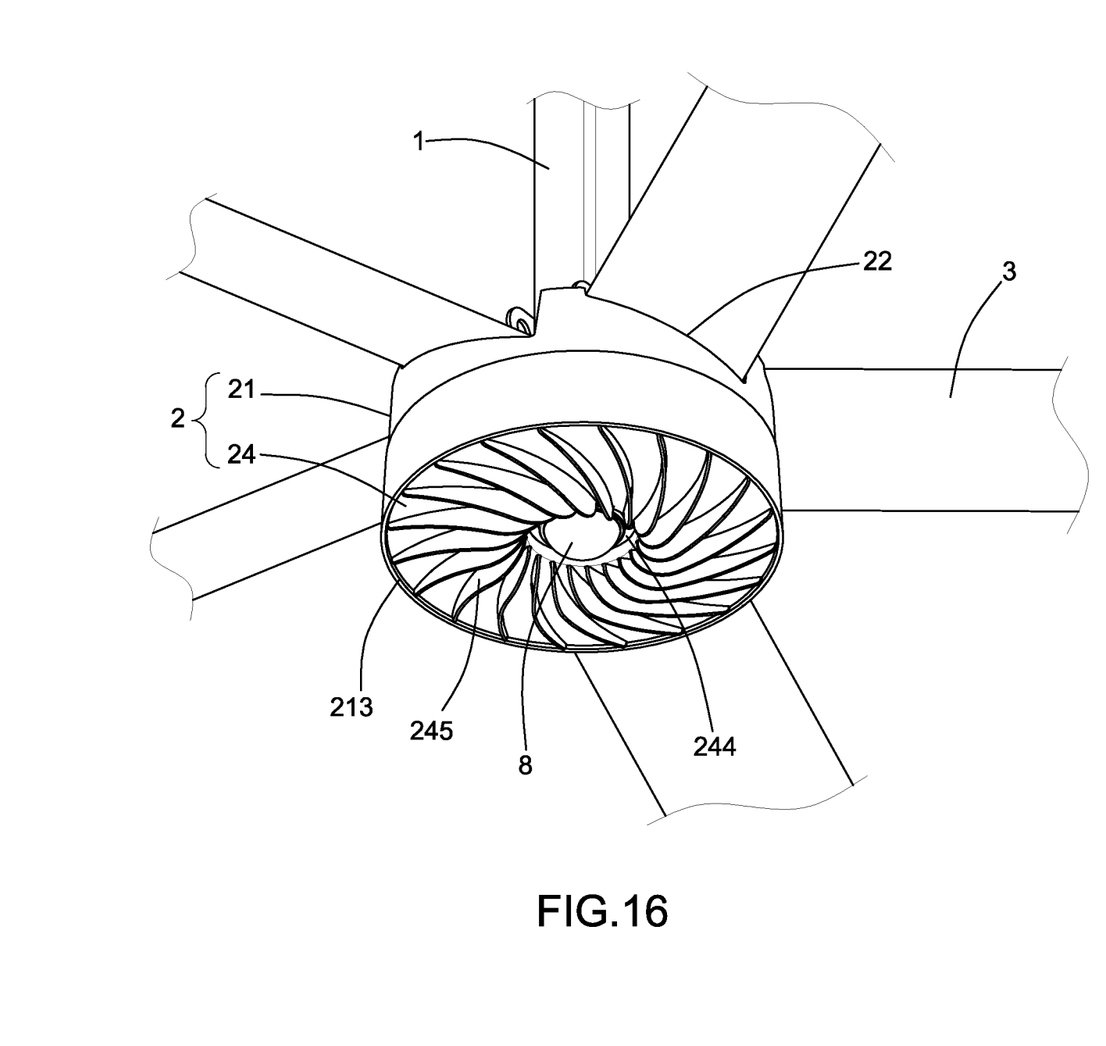
FIG. 16 is an oblique bottom elevational view of industrial ceiling fan structure of the present invention, showing the structure of the motor main unit.
Figure 17:
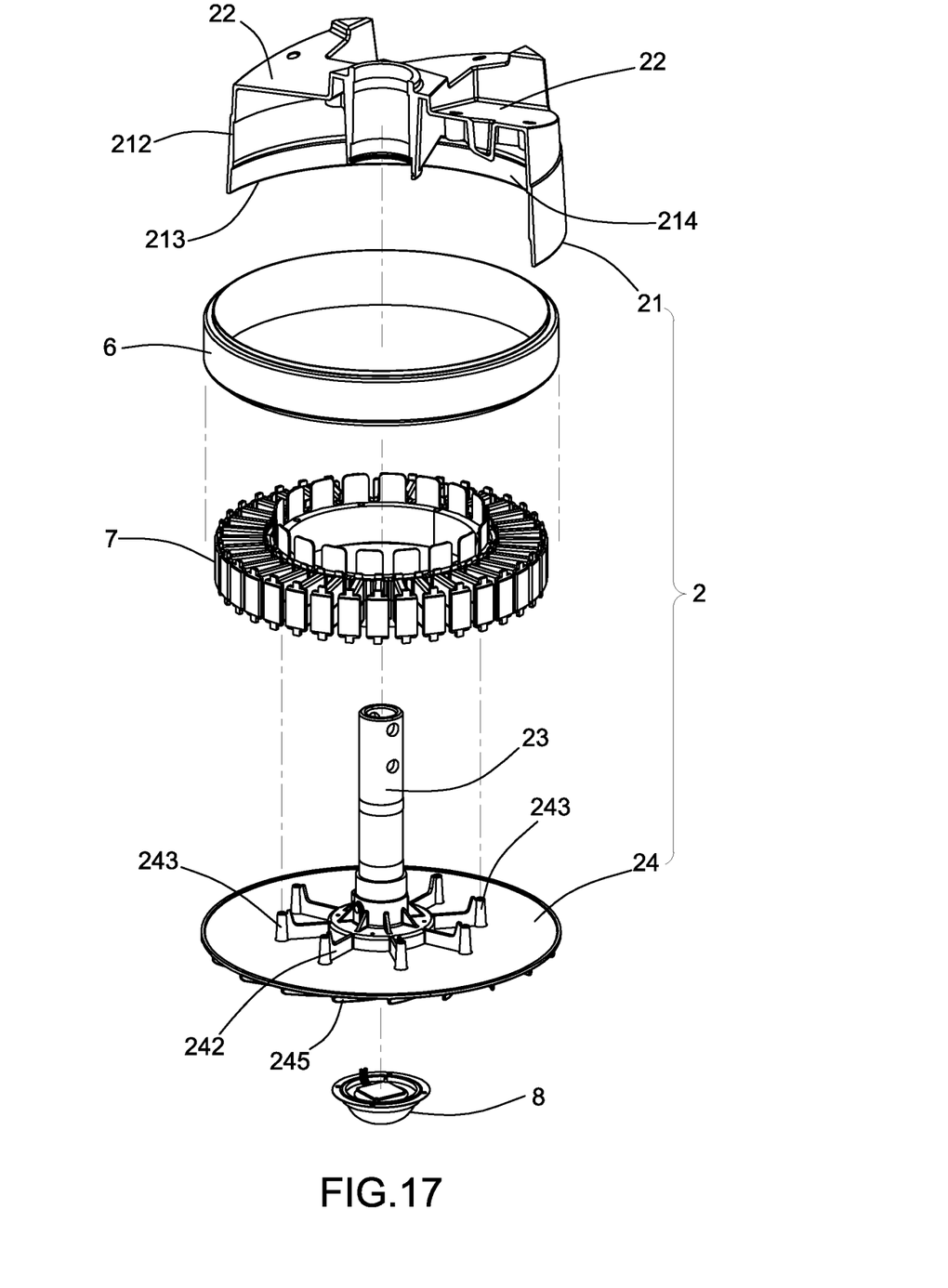
FIG. 17 is an exploded view of a part of the industrial ceiling fan structure of the present invention, showing the relationship between the heat-dissipating end cover and the outer casing.

Referring to FIG. 16 and FIG. 17, the outer casing 21 of the motor main unit 2 of the present invention is made of an aluminum-based alloy with a high heat conduction efficiency. The outer casing 21 has the shell top 211 and the peripheral wall 212 described above, so that the outer casing 21 can be rotated on the fixed shaft 23. The other end of the peripheral wall 212 forms an opening 213, and a cavity 214 recessed from the opening 213 toward the shell top 211 for accommodating the outer rotor 6 and the inner stator 7 of the motor structure. A heat-dissipating end cover 24 is coupled to the opening 213 to thereby enclose the cavity 214.

Figure 18:
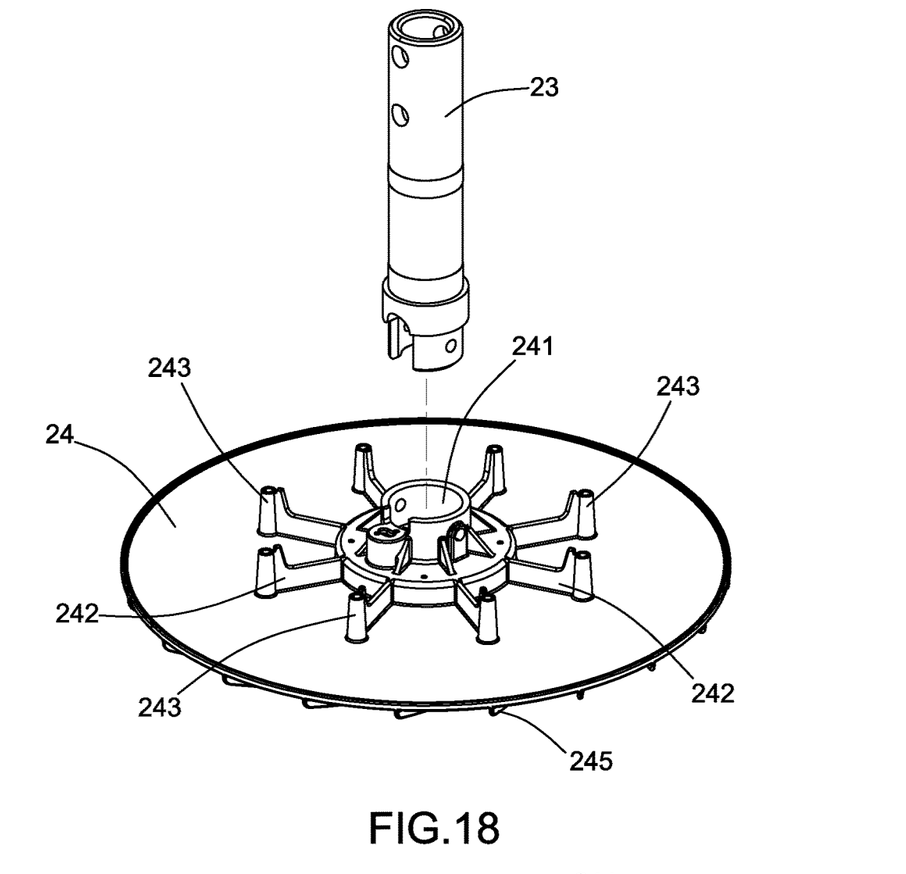
FIG. 18 is an exploded view of a part of the industrial ceiling fan structure of the present invention, showing the relationship between the heat-dissipating end cover and the fixed shaft.
Figure 19:
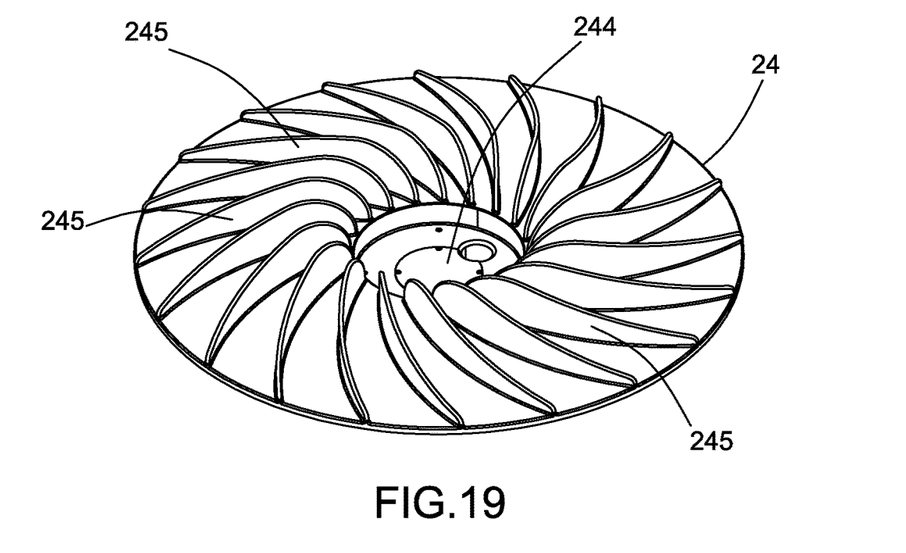
FIG. 19 is an elevational view showing the structure of the bottom side of the heat-dissipating end cover.

Referring to FIG. 16, FIG. 18 and FIG. 19, the heat-dissipating end cover 24 is also made of an aluminum-based alloy. It can be a circular or polygonal shape. The heat-dissipating end cover 24 is assembled at the end of the fixed shaft 23 such that the heat-dissipating end cover 24 corresponds to the opening 213 at one end of the peripheral wall 212 of the outer casing 21 and shields the cavity 214. The center of the heat-dissipating end cover 24 has a shaft hole 241 for inserting the fixed shaft 23. The heat-dissipating end cover 24 has a plurality of heat-receiving fins 242 protruding from an inner surface thereof corresponding to the cavity 214. The heat-receiving fins 242 are arranged radially around the shaft hole 241. A positioning seat 243 for erecting and assembling the stator 7 is provided on the inner surface of the heat-dissipating end cover 24. The heat-dissipating end cover 24 further has a platform 244 located on the center of an outer surface thereof opposite to the cavity 214, and a plurality of radiation fins 245 arranged radially around the platform 244. The positioning seat 243 is preferably a plurality of locking posts arranged in a concentric manner relative to the shaft hole 241. The radiation fins 245 are arranged in a parabolic manner relative to the platform 244. The cross section of the radiation fins 245 is curved.

Referring to FIG. 16 and FIG. 19, the platform 244 of the heat-dissipating end cover 24 can be used for mounting a lamp 8 in a flat manner. In the embodiment shown in FIG. 20, the lamp 8 is a COB (chip-on-board) package of high power LED lamp. When the lamp 8 is directly attached to the platform 244 through a metal substrate, the waste heat generated by the illumination of the lamp 8 can be quickly dissipated to the outside through the aluminum alloy structure of the light-dissipating end cover 24, providing a good lamp working environment that will not affect the service life of the lamp 8 due to excessive heat accumulation.

Figure 20:
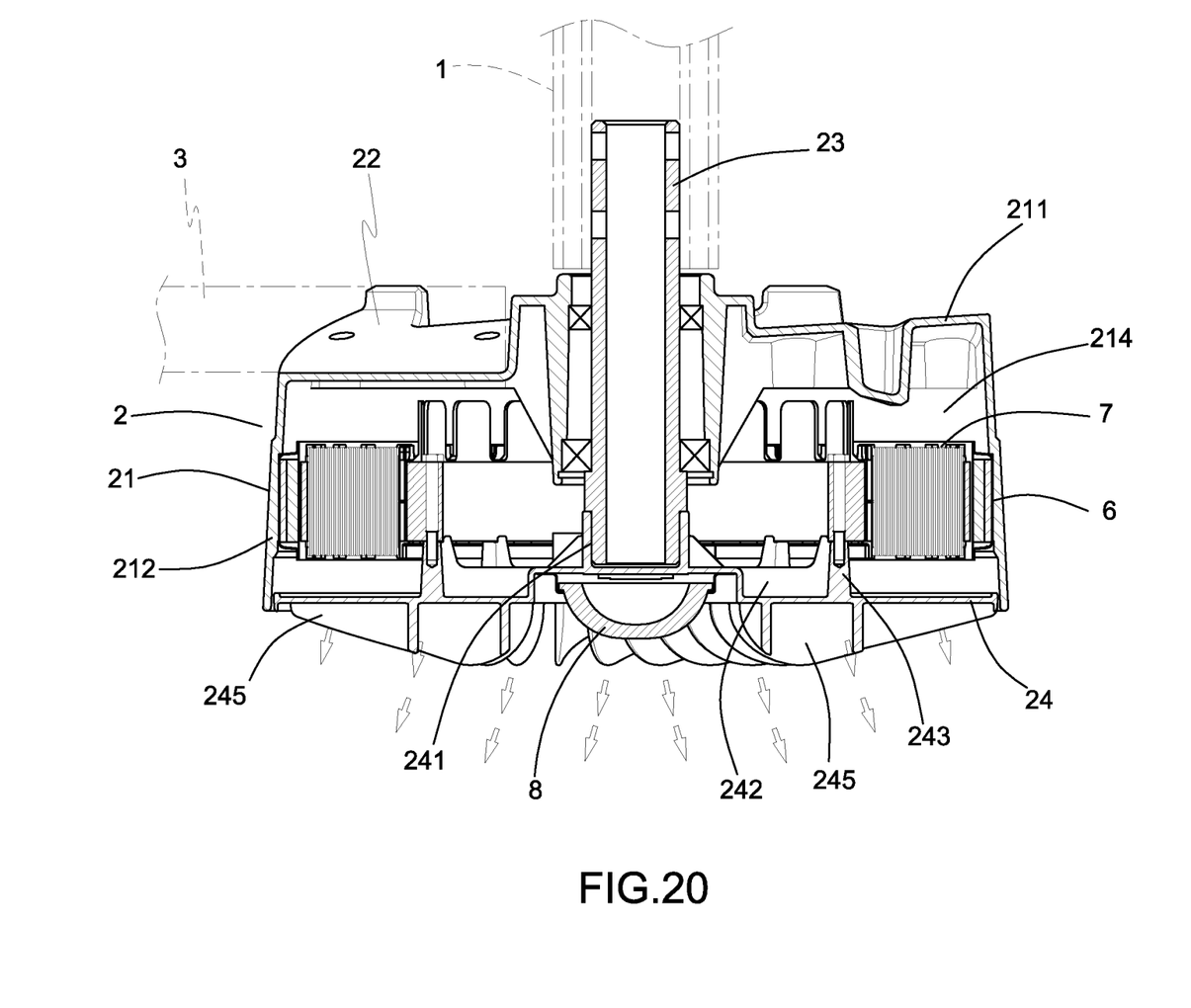
FIG. 20 is a schematic sectional view showing the arrangement of the heat dissipation structure and the motor main unit.

Furthermore, as shown in FIG. 20, the heat-dissipating end cover 24 of the industrial ceiling fan of the present invention is provided with a plurality of heat-receiving fins 242 on the inner surface thereof, thereby enhancing the transfer of waste heat from the inner stator 7 to the outside to prevent accumulation of heat in the motor. The outer surface of the heat-dissipating end cover 24 is provided with a plurality of radiation fins 245. When the radiation fins 245 are rotated together with the outer casing 21, cold air can pass through the radiation fins 245, thereby further improving the heat dissipation efficiency.

Although several particular embodiments of the invention have been described in detail for purposes of illustration, various modifications and enhancements may be made without departing from the spirit and scope of the invention. Accordingly, the invention is not to be limited except as by the appended claims.

What is claimed is:

1. An industrial ceiling fan structure, comprising a hanger, a motor main unit of an external rotor motor type mounted to said hanger, said motor main unit comprising a rotatable outer casing, and a plurality of blades, each of said plurality of blades having one end thereof affixed to said rotatable outer casing of said motor main unit, wherein said motor main unit comprises:

said rotatable outer casing comprising a shell top, a peripheral wall extended around said shell top and a fixed shaft located at the center of said shell top, said rotatable outer casing being rotatable on said fixed shaft; and an outer rotor comprising an outer race affixed to an inner surface of said peripheral wall of said rotatable outer casing, an inner race affixed to an inner surface of said outer race, a magnetic seal ring circumferentially mounted between said outer race and said inner race and a plurality of permanent magnets wrapped between said outer race and said inner race.

2. The industrial ceiling fan structure as claimed in claim 1, wherein said outer rotor further comprises a magnet spacer ring circumferentially coupled to an inner surface of said magnetic seal ring, said magnet spacer ring comprising a plurality of annularly arranged receiving holes; and said permanent magnets are respectively fixedly mounted in said plurality of annularly arranged receiving holes of said magnet spacer ring between said outer race and said inner race.

3. The industrial ceiling fan structure as claimed in claim 2, wherein said magnet spacer ring is formed of a plurality of curved spacers connected together, each of said plurality of curved spacers being provided with a respective one of said plurality of annularly arranged receiving holes.

4. The industrial ceiling fan structure as claimed in claim 1, wherein said outer race and said inner race are respectively composed of a stainless steel ring; said outer race comprises a groove located on an inner side thereof; and said magnetic seal ring, said magnet spacer ring and said permanent magnets are accommodated in the said groove of said outer race.

5. The industrial ceiling fan structure as claimed in claim 4, wherein said outer race has opposing upper and lower ends thereof respectively welded to opposing upper and lower ends of said inner race by a respective welding portion.

6. The industrial ceiling fan structure as claimed in claim 4, wherein said outer race has opposing upper and lower ends thereof respectively affixed to opposing upper and lower ends of said inner race by a rolling sealing technique.

* * * * *